United States Patent
Segawa

(10) Patent No.: US 7,467,876 B2
(45) Date of Patent: Dec. 23, 2008

(54) SURFACE LIGHT SOURCE DEVICE

(75) Inventor: Masaru Segawa, Kanagawa-ken (JP)

(73) Assignee: Victor Company of Japan, Limited, Yokohama-Shi (JP)

( * ) Notice: Subject to any disclaimer, the term of this patent is extended or adjusted under 35 U.S.C. 154(b) by 95 days.

(21) Appl. No.: 11/523,630

(22) Filed: Sep. 20, 2006

(65) Prior Publication Data

US 2007/0070616 A1 Mar. 29, 2007

(30) Foreign Application Priority Data

Sep. 21, 2005 (JP) ............................ P2005-274802
Aug. 25, 2006 (JP) ............................ P2006-229343

(51) Int. Cl.
*F21V 5/00* (2006.01)

(52) U.S. Cl. ........................ 362/244; 362/33; 362/246; 362/800

(58) Field of Classification Search ................. 362/97, 362/244, 246, 558, 217, 33
See application file for complete search history.

(56) References Cited

U.S. PATENT DOCUMENTS

| | | | | |
|---|---|---|---|---|
| 6,050,704 A | * | 4/2000 | Park | ............................ 362/260 |
| 6,142,647 A | * | 11/2000 | Hayakawa | ................... 362/230 |
| 6,404,131 B1 | * | 6/2002 | Kawano et al. | ................ 315/82 |
| 6,517,213 B1 | * | 2/2003 | Fujita et al. | .................... 362/84 |
| 6,561,663 B2 | * | 5/2003 | Adachi et al. | ................ 362/616 |
| 6,666,569 B2 | * | 12/2003 | Obata | .......................... 362/339 |
| 6,834,979 B1 | * | 12/2004 | Cleaver et al. | .............. 362/219 |
| 7,063,430 B2 | * | 6/2006 | Greiner | ........................ 362/30 |
| 7,097,339 B2 | * | 8/2006 | Chou et al. | .................. 362/612 |

FOREIGN PATENT DOCUMENTS

JP    10-082915    3/1998
JP    2578529      5/1998

* cited by examiner

*Primary Examiner*—Ali Alavi
(74) *Attorney, Agent, or Firm*—Nath Law Group; Jerald L. Meyer; Stan N. Protical

(57) ABSTRACT

A surface light source device 1 includes a base member 3 provided with a plurality of point-source lines, each of which has a plurality of point sources 11 arranged in a line, and a plurality of diffuse transmission members 14 for covering the point-source lines. Each of the diffuse transmission members 14 is located while keeping substantially equal distances from the respective point sources 11 at least in a direction perpendicular to each of the point-source lines. Consequently, it is possible to allow light fluxes emitted from the point sources 11 to be transmitted in diffusion through the diffusion transmission members 14.

7 Claims, 4 Drawing Sheets

SURFACE LIGHT SOURCE DEVICE

BACKGROUND OF THE INVENTION

1. Field of the Invention

The present invention relates to a surface light source device used in a non-emission display device or the like, and more particularly, relates to a surface light source device using point sources, such as light emission diodes (LED).

2. Description of the Related Art

There has been proposed a non-emission display device as represented by a liquid crystal display device. This non-emission display device is provided, behind a liquid crystal display device, with a surface light source device (backlight unit) for illuminating it.

Regarding such a surface light source device, Japanese Utility Model Registration No. 2578529 discloses a surface light source device having an optical waveguide that is adapted so as to take light from a light source through a side portion (incident surface) of the optical waveguide and to radiate the light as illumination light from a front portion (exit surface) of the optical waveguide. Due to this optical route, the above surface light source device is referred to as "edge-light type surface source device".

This surface light source device has a plurality of light sources that are arranged so as to oppose the side portion (incident surface) of the optical waveguide. Additionally, light emitted from the optical waveguide toward its rear side is reflected by a reflective sheet and brought back into the optical waveguide again.

In the "edge-light type" surface source device mentioned above, the light source is formed by either a linear light source (e.g. cold cathode fluorescent lamp) or point sources [e.g. light emission diodes (LED)]. With progress of luminous efficiency, it has been recently noted to employ light emission diodes as the point sources. The reasons are as follows: the light emission diode is generally longer lasting; it is effective in miniaturization and weight-saving; and the light emission diode is made from mercury-free materials, causing less deterioration of environment.

In adopting a point source (e.g. a light emission diode) as the light source, a plurality of point sources (e.g. a light emission diodes) are arranged in a straight line separately from each other. Additionally, these light emission diodes are arranged so as to oppose the side portion (incident surface) of the optical waveguide. In the surface light source device disclosed in Japanese Utility Model Registration No. 2578529, additionally, the optical waveguide is provided, on the side portion (incident surface), with recesses for receiving the light emission diodes in view of facilitating positioning of the diodes in the optical waveguide.

Japanese Patent Publication Laid-open No. H10(1998)-82915 discloses another surface light source device having an optical waveguide that is adapted so as to take light from a light source through a rear portion (incident surface) of the waveguide and to radiate the light as illumination light from a front portion (exit surface) of the waveguide. Due to this optical route, the above surface light source device is referred to as "inland-type surface source device". This surface light source device has a plurality of light sources that are arranged so as to oppose the rear portion of the optical waveguide. Additionally, light emitted from the optical waveguide toward the rear side of the optical waveguide is reflected by a reflective sheet and brought back into the optical waveguide again.

In this inland-type surface source device, similarly, the light source is formed by either a linear light source (e.g. cold cathode fluorescent lamp) or point sources (e.g. light emission diodes). In adopting a point source (light emission diode) as the light source, a plurality of point sources are arranged in a plane separately from each other. Additionally, these point sources are arranged so as to oppose the rear portion (incident surface) of the optical waveguide. In the surface light source device disclosed in Japanese Patent Publication Laid-open No. H10(1998)-82915, additionally, the optical waveguide is provided, on the rear portion (incident surface), with recesses for receiving the light emission diodes in view of facilitating positioning of the diodes in the optical waveguide.

In common with the "edge-light" type surface source device and the "inland" type surface source device, there are accordingly arranged, ahead of a front portion of the optical waveguide, a lens sheet for collecting lights emitted from the optical waveguide in view of improving luminance, and a diffuser sheet for uniformizing the luminance.

In the above-mentioned surface light source devices each having a plurality of point sources (light emission diodes) as the light source juxtaposed, however, the illumination light radiated from the exit surface of the optical waveguide is easy to cause luminance unevenness in connection with positioning of the point sources. The longer a distance between one point source and its adjoining point source gets, the more remarkable the luminance unevenness becomes.

Thus, if reducing the number of point sources with an elongation of the distance between the neighboring point sources in the above-mentioned surface light source device, then the above-mentioned luminance unevenness is caused to make nonsense of various merits brought by reducing the number of point sources (merits: e.g. easiness in production, reduction in manufacturing cost).

Meanwhile, if the surface light source device adopts, as the light source, light emission diodes each emitting a monochromatic light of red, green, or blue, it is required to make a high-grade incandescent light as a result of mixing respective colored lights emitted from these light emission diodes. Thus, the surface light source device has to equip an optical waveguide having a sufficient thickness and a light mixing chamber having a wide space so that lights emitted from the light emission diodes for respective colors are mixed with each other sufficiently.

In the above-mentioned "inland" type surface source device, an adoption of such an optical waveguide and a light mixing chamber having a wide space would cause the whole surface source device to be large-sized in thickness. Additionally, if the optical waveguide having a sufficient thickness is made from plastic material, then light loss is increased in an interior of the optical waveguide and at its boundary surfaces with surrounding materials. It means that the surface source device has to equip a number of light emission diodes, making both easiness in production and reduction in manufacturing cost even harder. Further, the above-mentioned conventional surface light source device is not provided under consideration of realizing a high-grade incandescent light as a result of mixing red, green, and blue lights with each other.

SUMMARY OF THE INVENTION

Under the above-mentioned issues, an object of the present invention is to provide a surface light source device in which a plurality of point sources are lined up and which is used for a non-emission display device or the like. In such an objective surface light source device, in detail, even if reducing the number of point sources and a thickness of a light mixing chamber, luminance (brightness) in illumination lights between the adjoining point sources could be improved to minimize unevenness in luminance, thereby producing various merits brought by reducing the number of point sources (merits: e.g. easiness in production, reduction in manufacturing cost). In connection with the reduction in a thickness of the light mixing chamber, another object of the present invention is to miniaturize the surface light source device.

In order to achieve the above issues, according to a first aspect of the present invention, there is provided a surface light source device for illuminating an object, comprising: a base member; at least one point-source line, arranged on the base member, including a plurality of point sources arranged in a line; and at least one diffusion transmission member that covers the point-source line with a substantially equal distance from the point sources at least in a direction perpendicular to the point-source line, thereby allowing light fluxes emitted from the point sources to be transmitted in diffusion through the diffusion transmission member.

In the surface light source device of the first aspect, according to a second aspect of the present invention, the point-source line includes the plurality of point sources disposed on a substrate.

In the surface light source device of the first aspect, according to a third aspect of the present invention, the surface light source device further comprises a reflective plate for reflecting lights emitted from the point sources.

In the surface light source device of the first aspect, according to a fourth aspect of the present invention, the surface light source device further comprises a diffuser plate that is opposed to the base member to cover the point-source line and the diffusion transmission member.

In the surface light source device of the first aspect, according to a fifth aspect of the present invention, the diffusion transmission member is made from light transmissive material containing diffusion agent.

In the surface light source device of the first aspect, according to a sixth aspect of the present invention, the diffusion transmission member includes a surface on which a plurality of micro-lenses are provided.

In the surface light source device of the first aspect, according to a seventh aspect of the present invention, the point sources include light emission diodes each of which emits any one of red, blue, and green lights.

DETAILED DESCRIPTION OF THE PREFERRED EMBODIMENTS

There will be described preferred embodiments of the present invention with reference to drawings, in detail.

$1^{st}$. Embodiment

Figure 1:
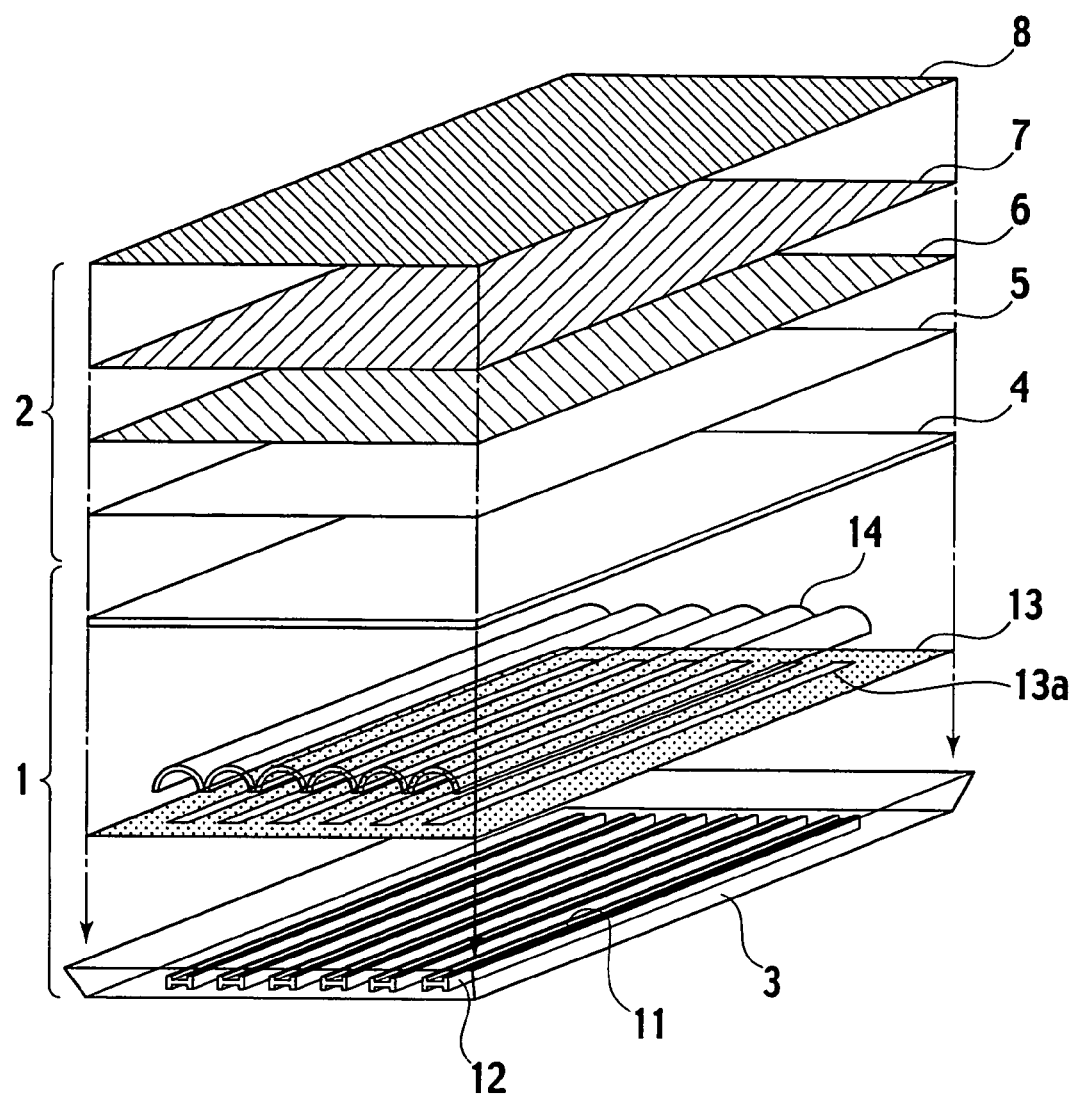
FIG. 1 is an exploded perspective view showing a constitution of a non-emission display device to which a surface light source device in accordance with a first embodiment of the present invention is applied.

FIG. 1 is an exploded perspective view showing a constitution of a non-emission display device on which a surface light source device in accordance with a first embodiment of the present invention is applied.

The surface light source device of the invention is used as an illuminating device in the non-emission display device, as shown in FIG. 1. This non-emission display device comprises a surface light source device 1 and a non-emission display part 2 forming an illuminated object illuminated by the surface light source device 1. Note that in FIG. 1, its upper side is defined as an exit side (front surface) of the surface light source device 1, while the lower side is defined as a rear side of the surface light source device 1.

The surface light source device 1 includes a light mixing chamber in the form of a casing, which accommodates a plurality of light emission diodes 11 forming a plurality of point sources and mixes respective colored lights emitted from the light emission diodes 11 to produce a high-grade white light (incandescent light). The light mixing chamber is formed by an aluminum chassis (base member) 3 equipped with the light emission diodes 11 and a diffuser plate 4 forming a front plate of the mixing chamber.

The aluminum chassis 3 is in the form of a substantial box. In the aluminum chassis 3, its inner wall portions do constitute a "rear-side" inner wall and "lateral-side" inner walls of the light mixing chamber. In this embodiment, at least part of the inner wall portions of the aluminum chassis 3 constitutes a reflective surface for reflecting incident light. A plurality of substrates 12 are mounted on the "rear-side" inner wall of the aluminum chassis 3, which opposes the diffuser plate 4. In each of the substrates 12, the light emission diodes 11 are arranged separately from each other in a line. The arrangement where a plurality of light emission diodes (i.e. point sources) 12 are arranged in a line on the substrate 12 will be referred to as "point-source line" after.

Additionally, a sheet-shaped reflective member 13 is laid on the "rear-side" inner wall of the aluminum chassis 3. The sheet-shaped reflective member 13 is provided with a plurality of openings 13a that allow a passage of the substrates 12 in assembling. Thus, the openings 13a are formed so as to correspond to the positions of the point-source lines. Note that the reflective member 13 may be arranged so that its part and respective ends of the substrates 12 overlap each other. The reflective member 13 is formed by either a sheet or tapes colored in white or silver. Of course, the reflective member 13 is arranged so that its white or silver surface opposes the diffuser plate 4.

Light fluxes of the light emission diodes 11 are emitted against the diffusion plate 4 to illuminate the non-emission display part 2 above the diffuser plate 4 (i.e. the upper side of FIG. 1). The diffuser plate 4 is formed with diffuse transmissibility.

As mentioned previously, the plural light emission diodes 11 are arranged in a line on each substrate 12, constituting one point-source line. The substrates 12 mounting the light emission diodes 11 thereon are attached to the "rear-side" inner wall of the light mixing chamber (i.e. the base member 3). As the point source in the surface light source device 1, a solid light emission element is available. Besides the light emission diode (LED) 11, there may be adopted an electroluminescence (EL) element. Regarding these point sources, it is preferable to employ the light emission diodes 11 emitting homogeneous lights of red, blue or green in order to maintain the above high-grade white light (incandescent light).

When employing the light emission diode 11 (as each point source) emitting a homogeneous light, the same diode 11 is made of AlGaAs, AlGaInP or GaASP (as an element emitting red light); InGaN or AlGaInP (as an element emitting green light); InGaN (as an element emitting blue light) or the like.

The non-emission display part 2 comprises a diffusion sheet 5 into which an illumination light from the surface light source device 1 enters, a prism sheet 6 that the illumination light transmitted through the diffusion sheet 5 enters, a polarizing sheet 7 that the illumination light transmitted through the prism sheet 6 enters and a transmissive liquid crystal panel 8 that the illumination light transmitted through the polarizing sheet 7 enters.

The diffusion sheet 5 has a characteristic to allow the incident light to be transmitted therethrough while diffusing with designated directivity in order to reduce its luminance unevenness and increase a frontal luminance. The prism sheet 6 has a characteristic to allow the incident light to be transmitted therethrough with designated directivity in order to increase frontal and horizontal luminance furthermore. The polarizing sheet 7 allows the incident light to be transmitted in the form of a linearly polarized light of a designated direction. The liquid crystal panel 8 is formed by a pair of transparent substrates between which liquid crystal is charged. Impressed by driving voltage, the liquid crystal panel 8 arrays liquid crystal molecules in a designated direction to change a polarizing direction of the incident light. This liquid crystal panel 8 is constructed so as to perform an image displaying since a predetermined driving voltage is impressed with respect to each pixel and additionally, the incident light is modulated and transmitted corresponding to an image to be displayed.

Figure 2:
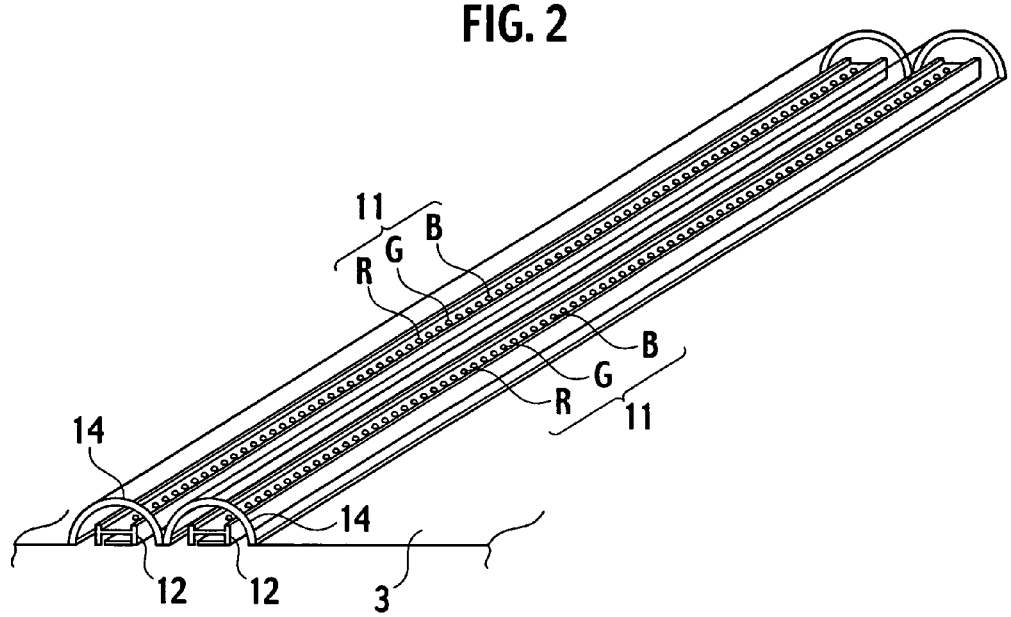
FIG. 2 is a perspective view showing an arrangement of light emission diodes in the surface light source device of FIG. 1.

FIG. 2 is a perspective view showing an arrangement of the light emission diodes 11 in this surface light source device 1.

In the light mixing chamber of the surface light source device 1, as shown in FIG. 2, a plurality of diffuse transmission members 14 (only two shown in the figure) are arranged to allow the light fluxes from the light emission diodes 11 to be transmitted in diffusion through the members 14. These diffusion transmission members 14 cover the point-source lines so as to be located while keeping substantially equal distances at least in directions each perpendicular to the point-source lines from the respective point sources.

In this embodiment, the surface light source device 1 includes a plurality of point-source lines arranged in parallel with each other. With respect to each point-source line, a plurality of light emission diodes 11 each emitting any of red, blue and green homogeneous lights are arranged in a line at regular intervals, on the substrate 12. The diffuse transmission member 14 is in the form of a semicylinder (or a tunnel) that centers on the point-source line. In this way, the plural diffuse transmission members 14 are arranged so as to cover the point-source lines respectively. Note that in the diffuse transmission member 14, its circumferential ends are fixed on the "rear-side" inner wall of the light mixing chamber. Consequently, since red, blue and green lights emitted from the respective light emission diodes 11 are effectively mixed with each other by the diffuse transmission members 14, the surface light source device 1 can produce high-grade white light.

FIGS. 3A to 3D are perspective views showing various configurations that the diffuse transmission member 14 in the surface light source device 1 may have.

Figure 3A:
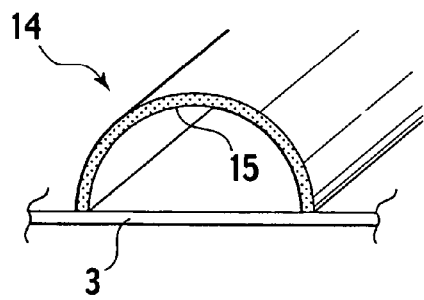
FIGS. 3A to 3D are perspective views showing a variety of diffuse transmission members in the surface light source device of FIG. 1.
Figure 3B:
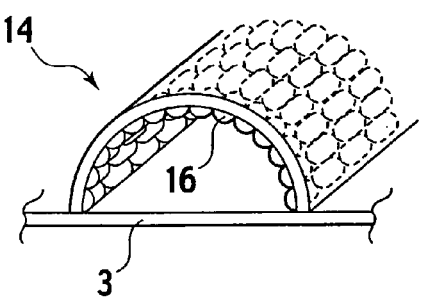
Figure 3C:
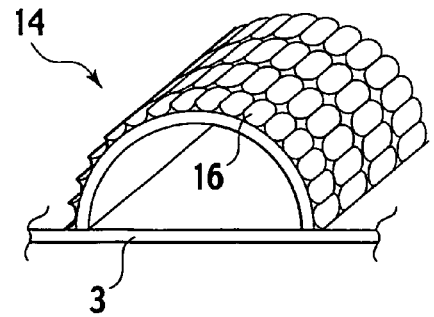
Figure 3D:
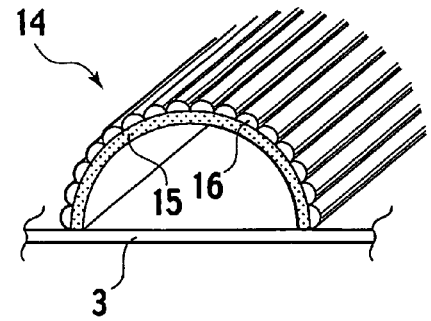

In order to effect its diffuse transmissibility, as shown in FIG. 3A, the diffuse transmission member 14 may be made from light transmissive material containing diffusion agent 15. Again, as shown in FIGS. 3B and 3C, the diffuse transmission member 14 may be made from light transmissive material and also provided, on its surface, with a number of micro-lenses 16. Alternatively, as shown in FIG. 3D, the diffuse transmission member 14 may be made from light transmissive material containing diffusion agent 15 and also provided, on the surface of the light transmissive material, with a number of micro-lenses 16. In this embodiment, the above light transmissive material is formed by plastic material, glass material or the like. It is noted that, as shown in FIGS. 3A and 3D, if forming the diffuse transmission member 14 by the light transmissive material containing the diffusion agent 15, then the surface light source device 1 can allow the light fluxes emitted from the respective point sources to be transmitted in diffusion through the diffuse transmission member 14 effectively.

For purposes of desired transmissivity and diffuse transmissibility, the diffuse transmission member 14 of this embodiment may be provided by appropriately combining various forms of FIGS. 3A to 3D with inclusion (or non-inclusion) of the diffusion agent 15. Note that the diffuse transmission member 14 made from light transmissive material containing no diffusion agent 15 could afford higher transmissivity.

In the diffuse transmission member 14 equipped with the micro-lenses 16, they may comprise either circular lenses or cylindrical lenses having axes in parallel with the point-source line. Alternatively, they may be formed by elliptical lenses having their long axes in parallel with the point-source line.

In forming the micro-lenses 16 on the surface of the light transmissive material containing the diffusion agent 15, they may comprise convex micro-lenses 16 formed on an outer surface of the diffuse transmission member 14, as shown in FIG. 3D. Instead, concave micro-lenses 16 may be formed on the outer surface of the diffuse transmission member 14. Or again, convex micro-lenses 16 may be formed on an inner surface of the diffuse transmission member 14. Alternatively, concave micro-lenses 16 may be formed on the inner surface of the diffuse transmission member 14.

When forming the micro-lenses 16 on the surface of the light transmissive material containing no diffusion agent 15, it is desirable to form either convex micro-lenses 16 on the inner surface of the diffuse transmission member 14 (see FIG. 3B) or concave micro-lenses 16 on the outer surface of the diffuse transmission member 14 (see FIG. 3C). In common, owing to the provision of the micro-lenses 16, the surface light source device can allow the light fluxes emitted from the respective point sources to be transmitted in diffusion through the diffuse transmission member 14 effectively.

In the arrangement of FIG. 3B, particularly, the diffuse transmission member 14 would be advantageous since returning reflection components due to full refection are reduced.

The diffuse transmission member 14 may be produced by extrusion using thermoplastic resin, pressing using thermoplastic resin or injection molding using thermoplastic resin. Thus, the diffuse transmission member 14 can be integrally and easily produced in a general forming procedure using a molding die, irrespective of convex or concave micro-lenses 16.

When lighting the respective light emission diodes 11 in the surface light source device 1, the illumination lights emitted from the diodes 11 are transmitted through the diffuse transmission member 14 and emitted from its outer surface into the light mixing chamber. As for the illumination lights emitted from the light emission diodes 11, during the above process, their outgoing (exit) angles into the light mixing chamber are increased owing to the diffuse transmission member 14. Thus, the illumination lights emitted from the light emission diodes 11 are emitted in diffusion toward the adjoining light emission diodes 11, advancing to the diffuser plate 4 while being mixed with each other.

Again, due to refection and diffusion in the light mixing chamber, parts of illumination lights from the light emission diodes 11 advance toward the "lateral-side" inner walls of the chamber and are reflected by them. After the reflection, the lights advance against the diffuser plate 4 while being mixed in colors in the light mixing chamber.

The illumination light that had been emitted outside the light mixing chamber through the diffuse transmission members 14 and the diffuser plate 4 and subsequently reflected into the light mixing chamber, are reflected by the reflective member 13, advancing against the diffuser plate 4 while being mixed in colors. In this way, the illumination light is discharged from the light mixing chamber again.

The illumination light emitted from the diffuser plate 4 is transmitted to the liquid crystal display panel 8 through the diffuser sheet 5, the prism sheet 6 and the polarizing sheet 7, illuminating the backside of the liquid crystal display panel 8. Owing to this illumination form, bright and proper images with no luminance unevenness can be displayed on a display surface of the liquid crystal display panel 8.

According to the surface light source device 1, owing to the provision of the diffuse transmission members 14, the thickness of the light mixing chamber (i.e. a distance from the "rear-side" inner wall up to the diffuser plate 4) can be reduced in comparison with the thickness of the light mixing chamber of the conventional surface light source device, improving exit efficiency of the exit lights. It is generally noted that the former thickness of the present invention is approx. 20 mm, while the latter thickness is approx. 50 mm.

According to the surface light source device 1, it is possible to restrain an occurrence of luminance unevenness since the illumination lights emitted from the light emission diodes 11 are diffused in the light mixing chamber widely. Additionally, owing to the reflective surfaces of the "lateral-side" inner walls and the "rear-side" inner wall forming the light mixing chamber and the reflective member 13, the illumination lights transmitted from the light emission diodes 11 toward the "lateral-side" inner walls and the "rear-side" inner wall of the light mixing chamber can be conducted to the diffuser plate 14 effectively. Consequently, it is possible to increase an amount of light forming the exit light, accomplishing an improvement of luminance.

In the surface light source device 1, since the illumination light is supplied in between the adjoining light emission diodes 11 to compensate deficiency in the amount of light, the luminance unevenness can be eliminated to realize homogenization of luminance in the effective emission areas, allowing a thickness of the light mixing chamber and an interval between the adjoining light emission diodes 11 to be together reduced without deteriorating the performance of the device. In other words, it is possible to reduce the number of light emission diodes 11 while ensuring a desired performance of the device, realizing a reduction in manufacturing cost.

Figure 4:
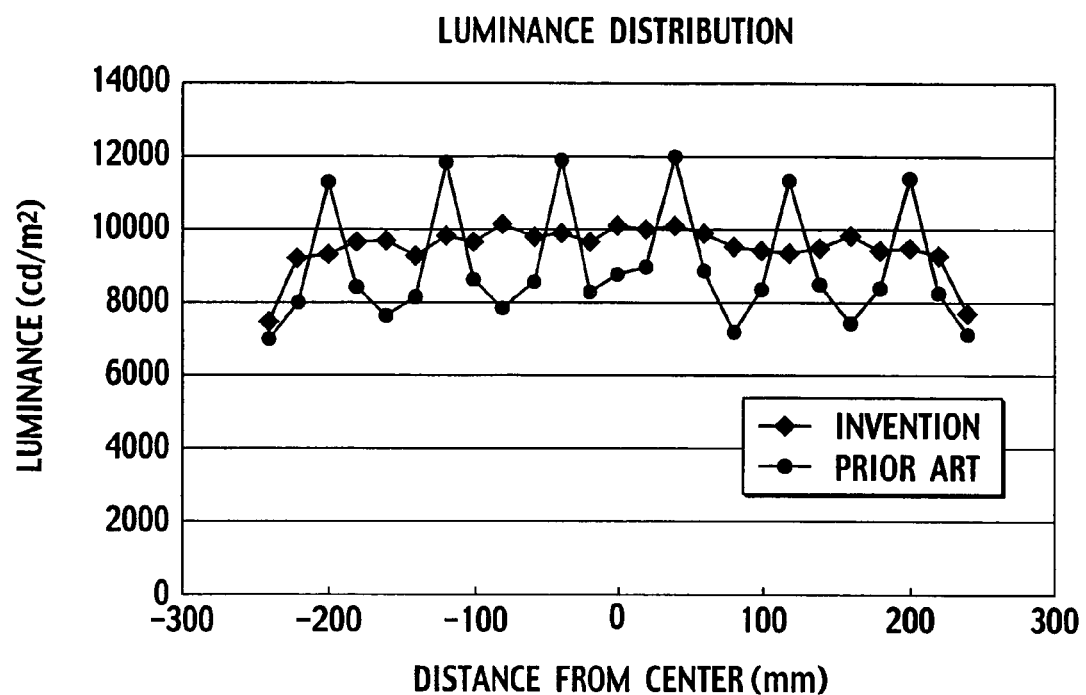
FIG. 4 is a graph showing luminance distributions at an exit surface of the surface light source device and an exit surface of a conventional surface light source device.

FIG. 4 is a graph showing luminance distributions at respective exit surfaces of the surface light source device and a conventional surface light source device;

Here is a measurement method adopted in the present invention. Regarding a long side's center of the diffuser plate 4 as an origin O, we established measurement areas in parallel with a short side of the diffuser plate 4, at respective points of ±150 mm and ±300 mm apart from the origin O. Again, regarding the short side's center of the diffuser plate 4 as an origin O, we established twelve set points at intervals of 20 mm in both ± (plus and minus) directions from the origin O. That is, it means that measurement values at five set points in the long side's direction could be obtained with respect to one set point in the short side's direction. In the surface light source device 1 shown in FIG. 1, a near side in the long side's direction which coincides with an arrangement direction of the light emission diodes 11 designates a minus (−) direction from the origin O; a far-back side in the long side's direction designates a plus (+) direction; a left side in the short side's direction designates a minus (−) direction from the origin O; and a right side in the short side's direction designates a plus (+) direction from the origin O.

In FIG. 4, its vertical axis represents each average (luminance) of five measurement values in the long side's direction obtained with respect to each set point in the short side's direction is represented by of FIG. 4, while the horizontal axis represents respective set points in the short side's direction.

Provided the light mixing chamber has a thickness of 20 mm, the luminance distribution at the exit surface of the surface light source device 1 (having the diffuse transmission member 14) of the present invention is compared with the luminance distribution at the exit surface of the conventional surface light source device having no diffuse transmission member. As a result, it will be understood that luminance unevenness is obviously eliminated in the surface light source device 1 of the present invention, in comparison with the conventional surface light source device. In other words, the homogenization in luminance in effective emission areas is accomplished by the surface light source device 1 of the present invention.

In the above-mentioned embodiment, the reflective member (portions) 13 are arranged between the adjoining substrates 12. Instead of arranging the reflective member 13, white or silver tapes (sheets) may be adhered to the substrates 12 directly. Alternatively, metal membranes, such as white (or silver) ink and aluminum, may be applied on the substrates 12 by printing or deposition. Further, in each of the light-source lines, the substrate 12 may be provided, on its portions between the adjoining light emission diodes 11, with the above white or silver tapes (sheets) by direct adhesion or the metal membranes, such as white (or silver) ink and aluminum, by printing or deposition.

In the light mixing chamber, additionally, a diffuse reflection pattern (as diffusion means) designed so as to allow the incident illumination light to be discharged from the diffuser plate 4 with uniform luminance may be applied on the "rear-side inner" wall.

In the above-mentioned embodiment, the light emission diodes 11 are arranged so that their exit lights oppose the diffuser plate 4. In a modification, by providing a reflective sheet or the reflective member 13 on the "rear-side" inner wall and the "lateral-side" inner walls of the aluminum chassis (base member) 3, the point-source lines (i.e. the light emission diodes 11) may be arranged on the "lateral-side" inner walls of the light mixing chamber so that the exit lights from the point-source lines advance in substantial-parallel with the diffuser plate 4. Additionally, without being limited to only a relatively-hard substrate, such as printed board, the substrate 12 may be formed by a flexible substrate in the form of a film.

In the above-mentioned embodiment, as shown in FIG. 1, the plural diffuse transmission members 14 are arranged correspondingly to the plural substrates 12 respectively. However, in a modification of the embodiment, the diffuse transmission member 14 may be integrated into a single member having a plurality of tunnel portions for covering the substrates 12 (i.e. point-source lines).

2nd. Embodiment

Figure 5:
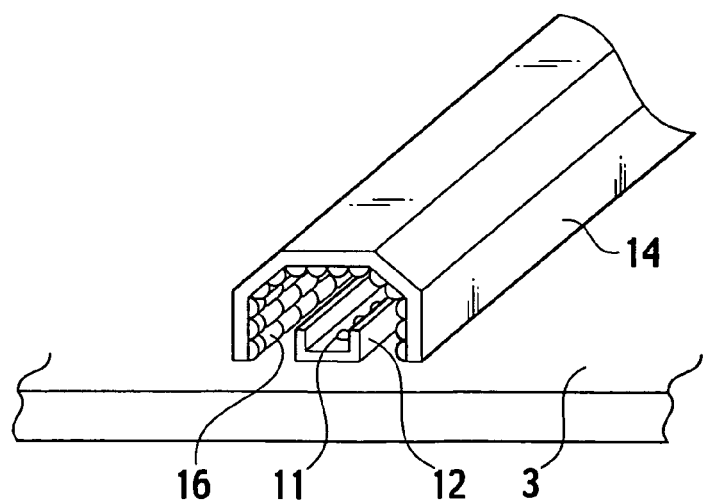
FIG. 5 is a perspective view showing a diffuse transmission member in a surface light source device in accordance with a second embodiment of the present invention.

FIG. 5 is a perspective view showing another profile of the diffuse transmission member 14 in the surface light source device, in accordance with the second embodiment of the present invention.

In the first embodiment mentioned above, the diffuse transmission member 14 is shaped so as to have a semicircular cross section along a direction perpendicular to the point-source line. In detail, the cross section of the diffuse transmission member 14 is shaped so as to draw a semicircle having radii of substantially equal distances in terms of a distance between a light emission surface (exit surface) of the light emission diode 11 and the diffuse transmission member 14. Besides, the diffuse transmission member 14 may be tunnel-shaped so that an exit angle of the illumination lights from the light emission diodes 11 into the light mixing chamber gets larger. For instance, as shown in FIG. 5, the diffuse transmission member 14 may be shaped to have a polygonal cross section along a direction perpendicular to the point-source line, which has substantially equal distances in terms of the distance between a light emission surface (exit surface) of the light emission diode 11 and the diffuse transmission member 14.

3rd. Embodiment

Figure 6:
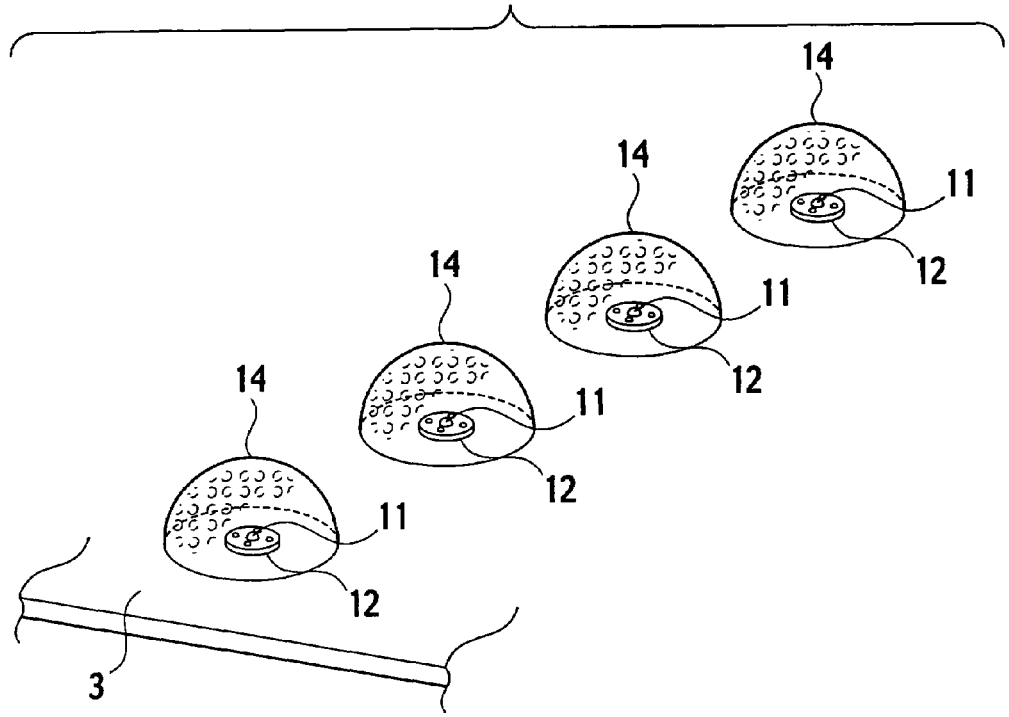
FIG. 6 is a perspective view showing diffuse transmission members in the surface light source device of FIG. 5, in accordance with a third embodiment of the present invention.

FIG. 6 is a perspective view showing a further profile of the diffuse transmission member 14 in the surface light source device, in accordance with the third embodiment of the present invention.

Again, FIG. 6 also shows an arrangement where the light emission diodes 11 are not arranged at regular intervals but rather in "block form" with respect to each combination of a certain number of colored lights. In this case, the diffuse transmission member 14 is semispherical-shaped so as to cover each light emission diode 11 with respect to each block, in a position where diffuse transmission member's distances from the block become substantially equal to each other. Note that reference numeral 12 denotes a substrate mounting the light emission diode 11.

4th. Embodiment

Figure 7:
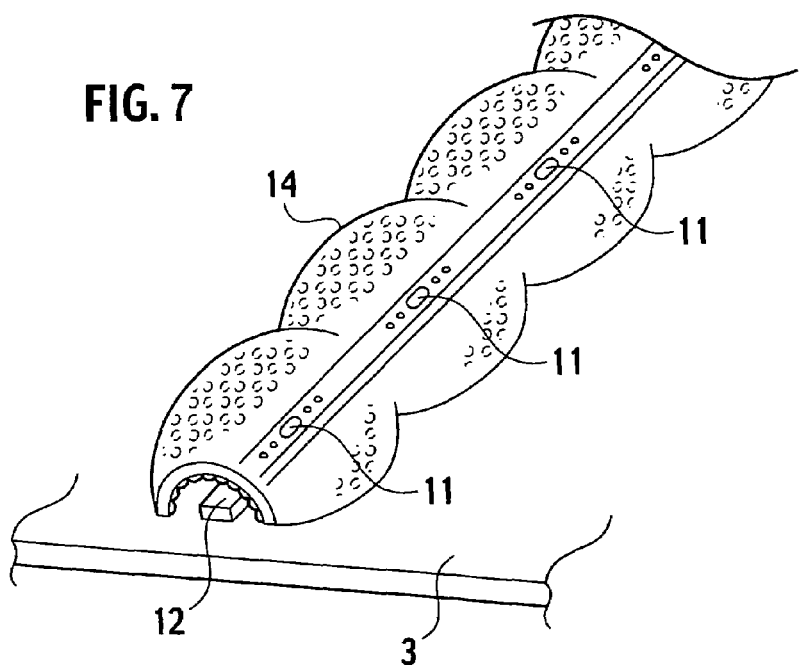
FIG. 7 is a perspective view showing a diffuse transmission member in the surface light source device of FIG. 5, in accordance with a fourth embodiment of the present invention.

FIG. 7 is a perspective view showing a still further profile of the diffuse transmission member 14 in the surface light source device, in accordance with the fourth embodiment of the present invention.

Similarly to FIG. 6, FIG. 7 shows another arrangement where the light emission diodes 11 are arranged in blocks with respect to each combination of a certain number of colored lights and an interval between the adjoining blocks is smaller than that of the arrangement of FIG. 6. In this case, the diffuse transmission member 14 is formed by a plurality of semispherical portions integrated into one body. Each of the semispherical portions is formed so as to cover each light emission diode 11 with respect to each block, in a position where diffuse transmission member's distances from the block become substantially equal to each other.

In common with the third and fourth embodiments, the diffuse transmission member(s) 14 allows the light flux emitted from each light emission diode 11 to be transmitted therethrough in diffusion, realizing the similar effect to the first embodiment.

In conclusion, according to the present invention, even if reducing the number of point sources and the thickness of a light mixing chamber in the surface light source device where a plurality of point sources are arranged in lines, the luminance (brightness) of illumination lights between the adjoining point sources could be improved to minimize luminance unevenness. Thus, with the reduction in the number of point sources, it becomes possible to facilitate manufacturing of the surface light source device and also possible to reduce the manufacturing cost. Additionally, with the reduction in a thickness of the light mixing chamber, it is possible to miniaturize the surface light source device.

Finally, it will be understood by those skilled in the art that the foregoing descriptions are nothing but embodiments of the disclosed surface light source device and therefore, various changes and modifications may be made within the scope of claims.

What is claimed is:

1. A surface light source device for illuminating an object, comprising:
   a base member;
   at least one point-source line, arranged on the base member, including a plurality of point sources arranged in a line; and
   at least one diffusion transmission member with a cylindrical shape extended in a direction parallel to the point-source line that covers the point-source line with a substantially equal distance from the point sources at least in a direction perpendicular to the point-source line, thereby allowing light fluxes emitted from the point sources to be transmitted in diffusion through the diffusion transmission member.

2. The surface light source device of claim 1, wherein the point-source line includes the plurality of point sources disposed on a substrate.

3. The surface light source device of claim 1, further comprising a reflective member for reflecting lights emitted from the point sources.

4. The surface light source device of claim 1, further comprising a diffuser plate that is opposed to the base member to cover the point-source line and the diffusion transmission member.

5. The surface light source device of claim 1, wherein the diffusion transmission member is made from light transmissive material containing diffusion agent.

6. The surface light source device of claim 1, wherein the diffusion transmission member includes a surface on which a plurality of micro-lenses are provided.

7. The surface light source device of claim 1, wherein the point sources include light emission diodes, each of which emits any one of red, blue, and green lights.

* * * * *